(12) United States Patent
Banks et al.

(10) Patent No.: US 12,112,360 B2
(45) Date of Patent: Oct. 8, 2024

(54) DYNAMICALLY GENERATING CONSUMPTION ARTIFACTS FOR PLATFORMS USING INDEPENDENT PROCESSING OF USAGE EVENT DATA STREAMS

(71) Applicant: Continuous Technologies, Inc, Mountain View, CA (US)

(72) Inventors: John Banks, Mountain View, CA (US); Yongqiang He, Mountain View, CA (US); Ramin Yavari, Mountain View, CA (US); Sudaakeran Balasubramanian, Mountain View, CA (US)

(73) Assignee: CONTINUOUS TECHNOLOGIES, INC., Mountain View, CA (US)

( * ) Notice: Subject to any disclaimer, the term of this patent is extended or adjusted under 35 U.S.C. 154(b) by 0 days.

(21) Appl. No.: 18/391,415

(22) Filed: Dec. 20, 2023

(65) Prior Publication Data
US 2024/0212009 A1    Jun. 27, 2024

Related U.S. Application Data

(60) Provisional application No. 63/434,971, filed on Dec. 23, 2022.

(51) Int. Cl.
*G06Q 30/04* (2012.01)
*G06F 9/54* (2006.01)

(52) U.S. Cl.
CPC ............ *G06Q 30/04* (2013.01); *G06F 9/547* (2013.01)

(58) Field of Classification Search
CPC ............................ G06Q 30/04; G06F 9/547
See application file for complete search history.

(56) References Cited

U.S. PATENT DOCUMENTS

| | | | | |
|---|---|---|---|---|
| 7,739,159 B1* | 6/2010 | Chandrupatla | ..... | H04L 12/1403 705/40 |
| 7,849,008 B1* | 12/2010 | Ekker | .................. | H04M 15/00 705/40 |
| 7,970,713 B1* | 6/2011 | Gorelik | ................. | G06Q 30/06 705/7.29 |
| 8,229,884 B1* | 7/2012 | Bluhm | ................. | G06F 11/324 707/828 |
| 9,779,431 B1* | 10/2017 | Sahay | ..................... | G06Q 30/04 |
| 9,928,469 B1* | 3/2018 | Roth | ...................... | G06Q 10/00 |
| 10,074,115 B1* | 9/2018 | Hynoski | ................ | G06Q 30/04 |

(Continued)

*Primary Examiner* — Ashford S Hayles

(57) ABSTRACT

Embodiments herein provide a method for dynamically generating consumption artifacts for platforms using independent processing of usage event data streams. The method includes (i) obtaining usage event data streams through calls to an API, (ii) updating a technical lifecycle event map, (iii) initializing time streams of consumption impacts at a configurable time stream interval, (iv) performing independent logic processing for each category of time stream of consumption, (v) invoking specific algorithms and data models for a plurality of computation modules to process each consumption event in real-time across multiple timestreams, and (vi) mapping the processed technical data to predefined technical structures using a headless API to dynamically generate a set of consumption artifacts that are associated with usage consumptions to transmit to external systems.

15 Claims, 7 Drawing Sheets

(56) References Cited

U.S. PATENT DOCUMENTS

| | | | |
|---|---|---|---|
| 10,360,087 B2* | 7/2019 | Suter | G06F 9/546 |
| 10,713,732 B2* | 7/2020 | Shak | G06Q 40/12 |
| 10,783,002 B1* | 9/2020 | Dubey | G06F 11/302 |
| 10,853,780 B1* | 12/2020 | Sirota | G06Q 10/06 |
| 10,938,674 B1* | 3/2021 | Natanzon | H04L 41/5096 |
| 11,258,824 B1* | 2/2022 | Hinrichs | G06F 21/604 |
| 11,526,425 B1* | 12/2022 | Karis | G06F 11/3452 |
| 2002/0082881 A1* | 6/2002 | Price | G06Q 30/0283 |
| | | | 705/26.1 |
| 2002/0083003 A1* | 6/2002 | Halliday | G06Q 30/04 |
| | | | 705/52 |
| 2002/0164025 A1* | 11/2002 | Raiz | G06F 21/1015 |
| | | | 380/231 |
| 2003/0061404 A1* | 3/2003 | Atwal | G06Q 30/04 |
| | | | 719/328 |
| 2003/0187794 A1* | 10/2003 | Irwin | H04M 15/80 |
| | | | 705/40 |
| 2003/0232616 A1* | 12/2003 | Gidron | H04M 15/00 |
| | | | 455/406 |
| 2004/0064411 A1* | 4/2004 | Tsui | G06Q 30/06 |
| | | | 705/40 |
| 2004/0117224 A1* | 6/2004 | Agarwal | G06Q 20/1235 |
| | | | 705/412 |
| 2004/0117311 A1* | 6/2004 | Agarwal | H04L 12/1432 |
| | | | 705/52 |
| 2004/0167859 A1* | 8/2004 | Mirabella | G06Q 30/04 |
| | | | 705/59 |
| 2005/0065879 A1* | 3/2005 | Birch | G06Q 20/102 |
| | | | 705/40 |
| 2005/0138111 A1* | 6/2005 | Aton | G06F 11/3476 |
| | | | 709/201 |
| 2005/0165656 A1* | 7/2005 | Frederick | G06Q 30/0601 |
| | | | 705/26.1 |
| 2005/0229219 A1* | 10/2005 | Posabella | H04M 15/68 |
| | | | 725/87 |
| 2006/0010236 A1* | 1/2006 | Meiser | H04L 67/306 |
| | | | 709/226 |
| 2010/0145718 A1* | 6/2010 | Elmore | G06Q 10/06 |
| | | | 719/315 |
| 2011/0078411 A1* | 3/2011 | Maclinovsky | G06Q 10/06 |
| | | | 712/30 |
| 2011/0113436 A1* | 5/2011 | Pal | G06F 11/2094 |
| | | | 719/328 |
| 2011/0225074 A1* | 9/2011 | Khosravy | G06Q 10/10 |
| | | | 715/810 |
| 2012/0191536 A1* | 7/2012 | Chen | G06Q 40/12 |
| | | | 705/30 |
| 2014/0006237 A1* | 1/2014 | Chiang | G06Q 30/04 |
| | | | 705/34 |
| 2014/0279320 A1* | 9/2014 | Scheinblum | G06Q 30/04 |
| | | | 705/34 |
| 2015/0004932 A1* | 1/2015 | Kim | H04M 15/68 |
| | | | 455/407 |
| 2018/0315141 A1* | 11/2018 | Hunn | G06F 9/547 |
| 2019/0188760 A1* | 6/2019 | Ekambaram | G06Q 30/0283 |
| 2019/0259047 A1* | 8/2019 | Bharti | G06Q 30/0201 |
| 2020/0380478 A1* | 12/2020 | Omori | G06Q 20/085 |
| 2021/0406089 A1* | 12/2021 | Keller | G06F 9/5077 |
| 2022/0067041 A1* | 3/2022 | Wright | G06F 16/128 |
| 2022/0413977 A1* | 12/2022 | Petracca | G06F 8/70 |
| 2023/0316348 A1* | 10/2023 | Dageville | G06Q 30/04 |
| | | | 705/34 |
| 2024/0242252 A1* | 7/2024 | Kachhadiya | G06Q 30/0283 |
| 2024/0242254 A1* | 7/2024 | Venkataraman | G06Q 30/0283 |

* cited by examiner

OBTAINING USAGE EVENT DATA STREAMS THROUGH CALLS TO AN APPLICATION PROGRAMMING INTERFACE (API), WHEREIN THE USAGE EVENT DATA STREAMS INCLUDE A UNIT OF MEASURE, A QUANTITY, AND A DATE AND TIME OF OCCURRENCE
602

UPDATING, USING A PROCESSOR, A TECHNICAL LIFECYCLE EVENT MAP BASED ON THE USAGE EVENT DATA STREAMS
604

INITIALIZING TIME STREAMS OF CONSUMPTION IMPACTS AT A CONFIGURABLE TIME STREAM INTERVAL THAT REPRESENTS A SLICE OF TIME WITHIN THE TIME STREAM AND SPECIFIC USAGE EVENT DATA ASSOCIATED WITH THE TIME STREAM, WHEREIN THE TIME STREAMS COMPRISE PRICING TIMESTREAMS, RATING TIME STREAMS, AND INVOICING TIME STREAMS
606

PERFORMING INDEPENDENT LOGIC PROCESSING FOR EACH CATEGORY OF TIME STREAM OF CONSUMPTION
608

INVOKING SPECIFIC ALGORITHMS AND DATA MODELS FOR A PLURALITY OF COMPUTATION MODULES TO PROCESS EACH CONSUMPTION EVENT IN REAL-TIME ACROSS MULTIPLE TIMESTREAMS
610

MAPPING THE PROCESSED TECHNICAL DATA TO PREDEFINED TECHNICAL STRUCTURES USING A HEADLESS API TO DYNAMICALLY GENERATE A SET OF CONSUMPTION ARTIFACTS THAT ARE ASSOCIATED WITH USAGE CONSUMPTIONS TO TRANSMIT TO AN EXTERNAL SYSTEM
612

FIG. 6

DYNAMICALLY GENERATING CONSUMPTION ARTIFACTS FOR PLATFORMS USING INDEPENDENT PROCESSING OF USAGE EVENT DATA STREAMS

CROSS-REFERENCE TO RELATED APPLICATIONS

This patent application claims priority to pending U.S. provisional patent application No. 63/434,971 filed on Dec. 23, 2022, the complete disclosures of which, in their entirety, are hereby incorporated by reference.

FIELD OF THE INVENTION

The embodiments herein relate to the field of software applications, and more specifically to dynamically generating consumption artifacts of applications using independent processing of usage event data streams.

BACKGROUND

Platform is defined as a business application associated with the product that may include a customer relationship management (CRM) application or a customer application, a financial system, an order management application, a sales application, a software platform. Products that are monetized by usage and consumption over time or with a balance that is consumed do not have a way to track the impact of each consumption over time, especially as pricing changes, and customers consume the products at different rates or with seasonality. Each of these consumption events over time has different impacts on pricing, forecasting, revenue, and invoicing, that existing ordering and billing systems cannot support.

The sum of the intervals for each given time period will be the amount that the current enterprise system (e.g. ERP) expects, but the level of detail is not captured in the current systems. Platforms want to offer usage and consumption pricing models with customers paying a prepaid amount and tracking based on using multiple products over time, or with special pricing that is given with the commitment to consume a predefined amount in a specific period. However, the ability to evaluate and track when customers mix these balances (prepaid, commitment, etc.) in connection with the subscription and usage pricing models is nearly impossible for customer relationship management (CRM) and enterprise resource planning (ERP) systems. The CRM may send an order to the ERP and the ERP does invoice, but these usage rating, hybrid subscription, prepayment, and commitment models require extensive interaction between CRM and ERP to keep them synchronized. Since the CRM and the ERP systems don't have the ability to track this lifecycle with the granularity needed, applications are unable to offer new products, or they try to implement bespoke or custom billing solutions to solve this problem.

Further, existing financial systems of applications are designed around customer documents such as cart, order, quote, invoice and payment, and billing systems are often designed around contracts, subscriptions (a form of contract), or projects. All of the entities and their parameters in the existing systems either remain constant or are captured in a way that makes the system too complex and rigid.

Accordingly, there remains a need for a more sophisticated and efficient method for mitigating and/or overcoming drawbacks associated with current methods.

SUMMARY

In view of the foregoing, embodiments herein provide a processor-implemented method for dynamically generating consumption artifacts for platforms using independent processing of usage event data streams. The method includes (i) obtaining usage event data streams through calls to an application programming interface (API), wherein the usage event data streams include a unit of measure, a quantity, and a date and time of occurrence, (ii) updating, using a processor, a technical lifecycle event map based on the usage event data streams, (iii) initializing time streams of consumption impacts at a configurable time stream interval that represents a slice of time within the time stream and specific usage event data associated with the time stream, wherein the time streams comprise pricing timestreams, rating time streams, and invoicing time streams, (iv) performing independent logic processing for each category of time stream of consumption, (v) invoking specific algorithms and data models for a plurality of computation modules to process each consumption event in real-time across multiple timestreams, and (vi) mapping the processed technical data to predefined technical structures using a headless API to dynamically generate a set of consumption artifacts that are associated with usage consumptions to transmit to an external system.

The method is of advantage that the method enables precise and real-time mapping of processed technical data to predefined technical structures using a headless API. This capability facilitates seamless and automated generation of a set of consumption artifacts associated with usage consumptions. The method provides a dynamic and adaptive approach, ensuring that the generated consumption artifacts accurately reflect the evolving parameters of the time streams, including pricing, rating, and invoicing. This not only enhances the efficiency of the method but also mitigates the challenges posed by traditional, static artifact generation processes.

Another technical advantage is that the method enables performing independent logic processing for each category of time stream of consumption. By utilization of computational modules and invoking specific algorithms and data models, the method is able to process each consumption event in real-time across multiple timestreams. This ensures a granular and context-aware generation of consumption artifacts, considering the dynamics of pricing, rating, and invoicing, thereby providing improved accuracy and adaptability, addressing the challenges associated with conventional approaches that lack the computational precision required for dynamic generation of consumption artifacts.

In some embodiments, the user event data streams are aggregated and validated based on predefined rules.

In some embodiments, the configurable time stream interval is selected from a group consisting of annual, quarterly, monthly, weekly, daily, hourly, and minute intervals.

In some embodiments, usage event data is mapped with a predefined charge using the headless API to generate billable items (consumption artifacts).

In some embodiments, the set of consumption artifacts are processed to generate an invoice, wherein the invoice includes details of the mapped usage event data and the predefined charge.

In one aspect, a system for dynamically generating consumption artifacts for platforms using independent processing of usage event data streams is provided. The system includes a memory that stores a set of instructions and a processor that is configured to execute the set of instructions.

The processor is configured to (i) obtaining usage event data streams through calls to an application programming interface (API), wherein the usage event data streams include a unit of measure, a quantity, and a date and time of occurrence, (ii) updating, using a processor, a technical lifecycle event map based on the usage event data streams, (iii) initializing time streams of consumption impacts at a configurable time stream interval that represents a slice of time within the time stream and specific usage event data associated with the time stream, wherein the time streams comprise pricing timestreams, rating time streams, and invoicing time streams, (iv) performing independent logic processing for each category of time stream of consumption, (v) invoking specific algorithms and data models for a plurality of computation modules to process each consumption event in real-time across multiple timestreams, and (vi) mapping the processed technical data to predefined technical structures using a headless API to dynamically generate a set of consumption artifacts that are associated with usage consumptions to transmit to an external system.

The system is of advantage that the system enables precise and real-time mapping of processed technical data to predefined technical structures using a headless API. This capability facilitates seamless and automated generation of a set of consumption artifacts associated with usage consumptions. The system provides a dynamic and adaptive approach, ensuring that the generated consumption artifacts accurately reflect the evolving parameters of the time streams, including pricing, rating, and invoicing. This not only enhances the efficiency of the system but also mitigates the challenges posed by traditional, static artifact generation processes.

Another technical advantage is that the system enables performing independent logic processing for each category of time stream of consumption. By utilization of computational modules and invoking specific algorithms and data models, the system is able to process each consumption event in real-time across multiple timestreams. This ensures a granular and context-aware generation of consumption artifacts, considering the dynamics of pricing, rating, and invoicing, thereby providing improved accuracy and adaptability, addressing the challenges associated with conventional approaches that lack the computational precision required for dynamic generation of consumption artifacts.

In some embodiments, the user event data streams are aggregated and validated based on predefined rules.

In some embodiments, the configurable time stream interval is selected from a group consisting of annual, quarterly, monthly, weekly, daily, hourly, and minute intervals.

In some embodiments, usage event data is mapped with a predefined charge using the headless API to generate billable items (consumption artifacts).

In some embodiments, the set of consumption artifacts are processed to generate an invoice, wherein the invoice includes details of the mapped usage event data and the predefined charge.

In another aspect, a non-transitory computer-readable storage medium storing a sequences of instructions, which when executed by one or more processors, causes for dynamically generating consumption artifacts for platforms using independent processing of usage event data streams by (i) obtaining usage event data streams through calls to an application programming interface (API), wherein the usage event data streams include a unit of measure, a quantity, and a date and time of occurrence, (ii) updating, using a processor, a technical lifecycle event map based on the usage event data streams, (iii) initializing time streams of consumption impacts at a configurable time stream interval that represents a slice of time within the time stream and specific usage event data associated with the time stream, wherein the time streams comprise pricing timestreams, rating time streams, and invoicing time streams, (iv) performing independent logic processing for each category of time stream of consumption, (v) invoking specific algorithms and data models for a plurality of computation modules to process each consumption event in real-time across multiple timestreams, and (vi) mapping the processed technical data to predefined technical structures using a headless API to dynamically generate a set of consumption artifacts that are associated with usage consumptions to transmit to an external system.

In some embodiments, the user event data streams are aggregated and validated based on predefined rules.

In some embodiments, the configurable time stream interval is selected from a group consisting of annual, quarterly, monthly, weekly, daily, hourly, and minute intervals.

In some embodiments, usage event data is mapped with a predefined charge using the headless API to generate billable items (consumption artifacts).

In some embodiments, the set of consumption artifacts are processed to generate an invoice, wherein the invoice includes details of the mapped usage event data and the predefined charge.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a flow diagram that illustrates a method for dynamically generating consumption artifacts for platforms using independent processing of usage event data streams according to some embodiments herein.

DETAILED DESCRIPTION OF PREFERRED EMBODIMENTS

Figure 1:
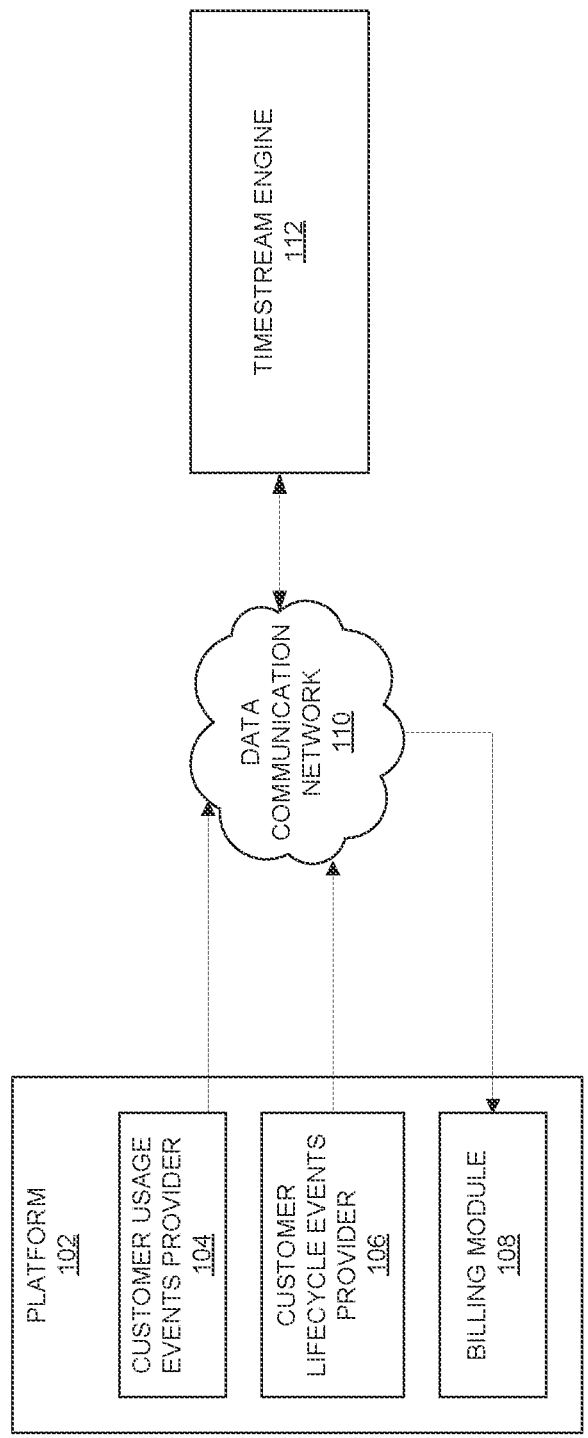
FIG. 1 is a block diagram that illustrates dynamically generating consumption artifacts for platforms using independent processing of usage event data streams according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As used herein, the following terms and phrases shall have the meanings set forth below. Unless defined otherwise, all technical terms used herein have the same meaning as commonly understood to one of ordinary skill in the art. The singular forms "a," "an," and "the" include plural reference unless the context clearly dictates otherwise.

In the view of the foregoing, a method for dynamically generating consumption artifacts of applications using independent processing of usage event data streams is fulfilled in the ongoing description by (i) obtaining usage event data streams through calls to an application programming interface (API), wherein the usage event data streams include a unit of measure, a quantity, and a date and time of occurrence, (ii) updating, using a processor, a technical lifecycle event map based on the usage event data streams, (iii) initializing time streams of consumption impacts at a configurable time stream interval that represents a slice of time within the time stream and specific usage event data associated with the time stream, wherein the time streams comprise pricing timestreams, rating time streams, and invoicing time streams, (iv) performing independent logic processing for each category of time stream of consumption, (v) invoking specific algorithms and data models for a plurality of computation modules to process each consumption event in real-time across multiple timestreams, and (vi) mapping the processed technical data to predefined technical structures using a headless API to dynamically generate a set of consumption artifacts that are associated with usage consumptions to transmit to an external system.

A term "product" is defined as any goods or services offered by an entity to its customers, for example computer, laptop, touring service, music subscription, software as a service, cloud service. etc.

A term "platform" is defined as a business application associated with the product that may include a customer relationship management (CRM) application or a customer application, a financial system, an order management application, a sales application, a software platform.

A term "consumption artifact" is defined as a computationally derived entity that captures nuanced details of usage of an application, allowing for precise tracking, forecasting, and adjustment of resource consumption over time. The consumption artifact may include a forecast, an adjustment, and a billable item.

A term "charge" is defined as an element of the application that a customer needs to pay for or track as part of customer relationship, separately, for example, an activation fee, a commitment amount, and a subscription fee for one individual product. Charges may be grouped under the same application and may also be grouped across products.

A term "time stream" or "timestream" is defined as one aspect of a charge over time. A time stream may be of different categories—pricing, rating, invoicing, forecasting, revenue recognition, business metrics, or a fully custom-defined aspect that is requested by the platform. A charge contains one or many time streams for each of the aspects of the charge. For example, a charge may hold multiple time streams for forecasting, each of them representing a different model of forecasting that the application is looking to use. For each aspect, the method may use a single time stream or multiple time streams depending on the use-case of the product.

A term "timestream interval" or "time stream interval" is defined as a manner in which time is sliced within a time stream. As an example, the time stream interval may be annual, quarterly, monthly, weekly, daily, or every second. Within each interval, the parameters related to a parent time stream aspect remain the same for the duration of the interval. For example, if a quantity in the first week is 1 but changes over time for the second week to be 2, then two intervals will be created. Each time stream interval holds one or more balances and several different parameters.

Referring now to the drawings, and more particularly to FIGS. 1 through 7, where similar reference characters denote corresponding features in a consistent manner throughout the figures, there are shown preferred embodiments.

FIG. 1 is a block diagram 100 that illustrates dynamically generating consumption artifacts for platforms using independent processing of usage event data streams according to some embodiments herein. The block diagram 100 includes a platform 102 that includes a customer usage events provider 104, a customer lifecycle events provider 106, and a billing module 108. The platform 102 is communicatively connected to a time stream engine 112 using a data communication network 110. In some embodiments, the data communication network 110 is a wired network. In some embodiments, the data communication network 110 is a wireless network. In some embodiments, the data communication network 110 is a combination of the wired network and the wireless network. In some embodiments, the data communication network 110 is the Internet. A list of devices that are capable of functioning as the time stream engine 112, without limitation, may include a public cloud, an application, a server network, a mobile phone, a Personal Digital Assistant (PDA), a tablet, a desktop computer, or a laptop.

The time stream engine 112 obtains usage event data streams through calls to an application programming interface (API), wherein the usage event data streams include a unit of measure, a quantity, and a date and time of occurrence.

The time stream engine 112 updates, using a processor, a technical lifecycle event map based on the usage event data streams.

The time stream engine 112 initializes a time stream of consumption impacts at a configurable time stream interval that represents a slice of time within the time stream and specific usage event data associated with the time stream, wherein the time streams comprise pricing timestreams, rating time streams, and invoicing time streams.

The time stream engine 112 performs independent logic processing for each category of time stream of consumption.

The time stream engine 112 invokes specific algorithms and data models for a plurality of computation modules to process each consumption event in real-time across multiple timestreams.

The time stream engine 112 maps the processed technical data to predefined technical structures using a headless API to dynamically generate a set of consumption artifacts that are associated with usage consumptions to transmit to an external system.

The time stream engine 112 is of advantage that the time stream engine 112 enables precise and real-time mapping of processed technical data to predefined technical structures using a headless API. This capability facilitates seamless and automated generation of a set of consumption artifacts associated with usage consumptions. The time stream engine 112 provides a dynamic and adaptive approach, ensuring that the generated consumption artifacts accurately reflect the evolving parameters of the time streams, including pricing, rating, and invoicing. This not only enhances the efficiency of the time stream engine 112 but also mitigates the challenges posed by traditional, static artifact generation processes.

Another technical advantage is that the time stream engine 112 enables performing independent logic processing for each category of time stream of consumption. By utilization of computational modules and invoking specific algorithms and data models, the time stream engine 112 is able to process each consumption event in real-time across multiple timestreams. This ensures a granular and context-aware generation of consumption artifacts, considering the dynamics of pricing, rating, and invoicing, thereby providing improved accuracy and adaptability, addressing the challenges associated with conventional approaches that lack the computational precision required for dynamic generation of consumption artifacts.

Figure 2:
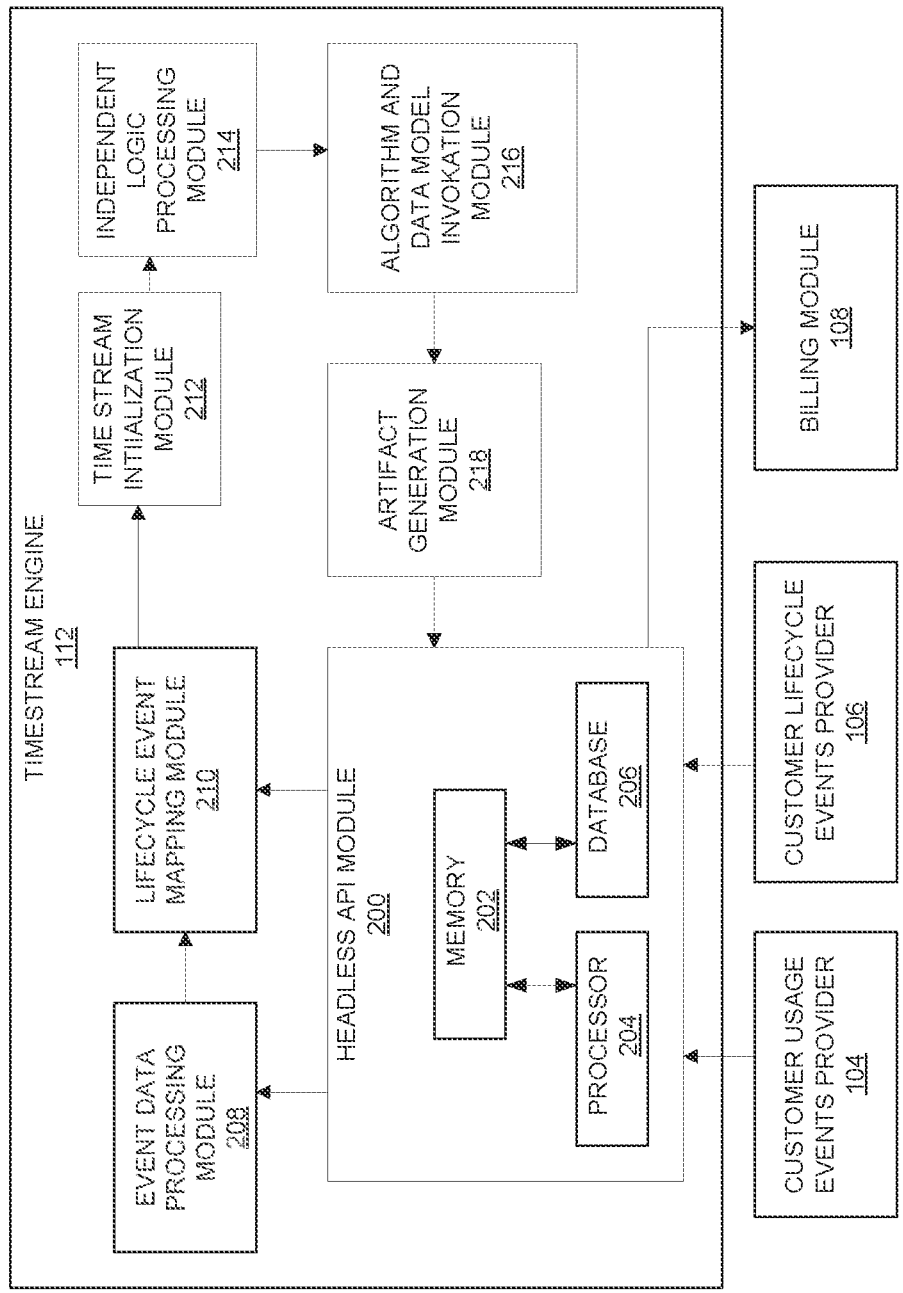
FIG. 2 is a block diagram of a time stream engine of FIG. 1 according to some embodiments herein.

FIG. 2 is a block diagram 201 of the time stream engine 112 of FIG. 1 according to some embodiments herein. The time stream engine 112 includes a headless API module 200, an event data processing module 208, a lifecycle event mapping module 210, a time streams initialization module 212, an independent logic processing module 214, and an algorithm, a data model invocation module 216 and an artifact generation module 218. The headless API module 200 includes a memory 202 and a processor 204 that is connected to a database 206.

The headless API module 200 obtains data streams of customer activity, consumption, and/or usage event from the customer usage events provider 104 of the platform 102, wherein the data streams are associated with a customer of the platform, a partner of the platform or an account. The customer usage events provider 104 may include, but are not limited to, one or more of a user log, a mediation system, a company application, a company system, an extract transform load (ETL) system, and a data warehouse.

In some embodiments, customer consumption usage event data is associated with the usage of a product of the platform 102 by the user. For example, each product may have 'n' charges. Each charge may have multiple time streams, which represent pricing, rating, and invoicing aspects. The same charge may have different interval sizes/frequencies for different time streams. For example, a particular charge may have a rating time stream with weekly intervals but an invoicing time stream with monthly intervals. In some embodiments, the creation of the intervals is fully independent of each time stream and is only a function of time for the parameters of the parent time stream.

The event data processing module 208 validates, in real-time or via batch intervals, the customer consumption usage event data, that is obtained at the headless API module 200, based on preconfigured configuration rules.

In some embodiments, consumption event aggregation may be performed. A customer may have a revenue model that may involve charging users based on an aggregate measure such as average( ), max( ), count( ), sum( ), etc. For example, a usage record may be for CPU utilization used at a particular snapshot of time, and the pricing may be for the max( ) of all CPU utilization numbers across a day.

The headless API module 200 obtains one or more customer lifecycle events from the customer lifecycle events provider 106 of the platform 102. In some embodiments, the customer lifecycle events provider 106 may include a customer relationship management application. The lifecycle event mapping module 210 updates a customer lifecycle event mapping using customer lifecycle events that are obtained at the headless API module 200. A unit of measure may be identified, for use in consumption rating and charging. The unit of measure may be, for example, in megabytes (MB) in the usage record, while a pricing model may be based on gigabytes (GB), in which case appropriate conversions are performed. This conversion may be dynamic in nature so that a single customer usage record may have different consumption units of measure, and further when rating, a unit of measure may be translated again for pooling pricing across various customer charges.

For usage products, as end customers (e.g., customers of the customers) use the products/services, they generate usage/consumption events. As consumption events come into the system, they are processed across multiple time streams and the amounts and balances are updated in parallel across them. The amounts and balances are updated with respective time streams that hold the parameters for the time frame associated with the amount and balances.

The time streams initialization module 212 initializes time streams of consumption impacts at a configurable time stream interval. The time streams of consumption impacts may be based on the customer lifecycle event map. The time streams may include a pricing time stream, a rating time stream, and an invoicing time stream, which are illustrated in more detail in FIG. 4.

When the end customer or the user uses the product, it is called consumption. The consumption has to be charged, tracked, and/or decremented from prepaid account balances associated with the user. Doing this in the context of time is referred to as "the rating time stream". In some embodiments, when the platform 102 needs to send an invoice to a customer, the time stream engine aggregates the consumption, purchases, and subscriptions in the context of an invoice period. In some embodiments, an additional ability to charge for a high watermark, an average of the usage over time, and various other calculations may be provided. This is referred to as "the invoicing time stream".

After events such as lead generation, quoting, contracting, order fulfillment, etc., the parameters of each aspect of the charge are negotiated and known. At this time, the time streams are initialized, which holds the data that enables the user to monitor the lifecycle of the entities throughout the time of the contract.

The time stream engine 112 calculates each of the concepts for each entity of the platform 102 and enables the user to see an impact for each of a plurality of intervals. This is not limited to a specific entity and applies to all entities that are term based and change over time. In some embodiments, the time stream is utilized by the platform 102 for independent logic processing. The independent logic processing module 214 performs independent logic processing for each category of time stream of consumption. The independent logic processing refers to open ended, and any kind of logic processing on different time streams based on a model of the platform 102. For example, using forecasting models to forecast amounts stored in time streams. In some embodiments, independent logic processing may be performed on the pricing timestream for supporting pricing based on multiple parameters, product type or a price matrix.

The algorithm and data model invocation module 216 invokes specific algorithms and data models for a plurality of computation modules to process each consumption event in real-time across multiple timestreams. The algorithm and data model invocation module 216 may be tracked in real-time, using the time streams of consumption impacts that are initialized at the time streams initialization module 212, each event in the customer consumption usage event data across different account balances associated with the user. Timestreams may be related across different charges, so it is possible to have a rated consumption refer to another charge pricing timestream, etc.

The artifact generation module 218 maps the processed technical data to predefined technical structures using a headless API to dynamically generate a set of consumption artifacts that are associated with usage consumptions to transmit to an external system.

As the lifecycle of the contract comes to an end (or even before that), the contract can be renewed (or amended) and the time streams are going to be extended/updated based on the new values which are again negotiated and signed. This may be done in conjunction or separate from contract and subscription changes.

In some embodiments, billable items (consumption artifacts) may be generated for the user by mapping the customer consumption usage event data obtained at the headless API module 200 with a predefined charge using the headless API module 200.

In some embodiments, when the platform 102 wants to see customer relationship in the context of pricing, rating, and invoicing at any point in time, the time stream engine 112 provides the consumption, rated data and/or billable item (consumption artifact) information in such a way that enables the CRM and the ERP to perform functions such as selling, quoting, contracting, ordering, forecasting, invoicing, tracking revenue, etc. without the need for complex integrations to other billing systems or custom-built solutions. The headless API module 200 may transmit the billable item (consumption artifact) to the billing module 108 of the platform 102.

Figure 3:
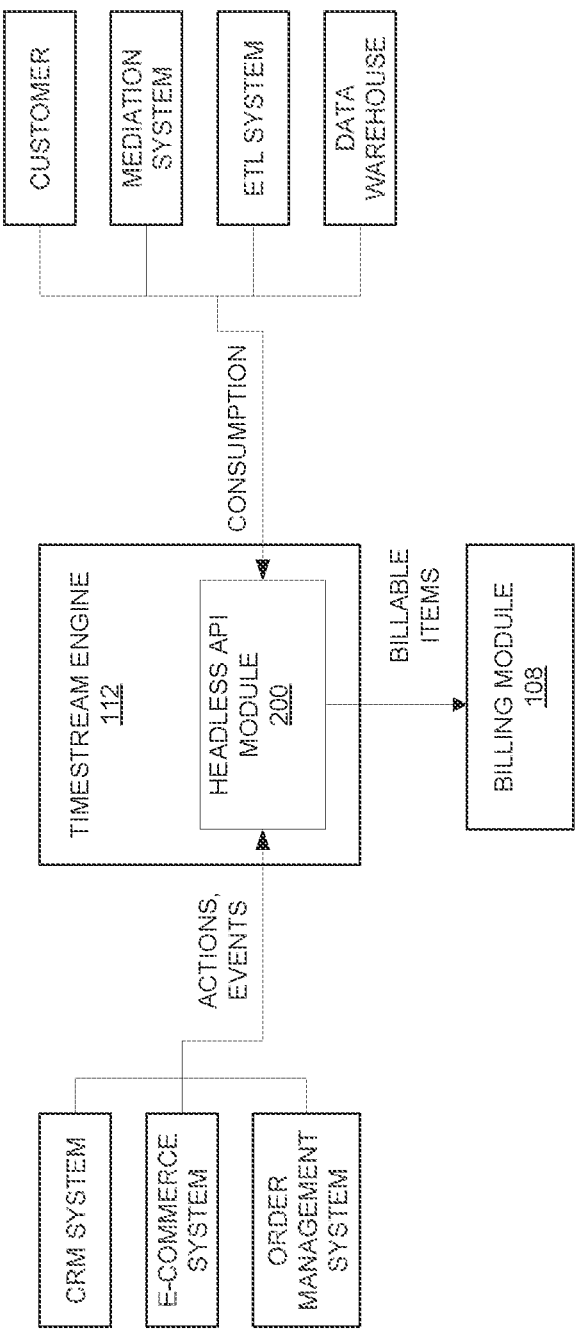
FIG. 3 is an exemplary diagram that illustrates a flow data to a headless API module of FIG. 1 for generating billable items (consumption artifacts) according to some embodiments herein.

FIG. 3 is an exemplary diagram 300 that illustrates flow data to the headless API module 200 of FIG. 1 for generating billable items (consumption artifacts) according to some embodiments herein. The headless API module 200 works with external systems such as CRMs, analytical tools, ERPs, data warehouses, etc. The headless API module 200 may consume or feed the data from and to any of these systems in real-time or delayed based on use-case. As different actions are taken that affect an end customer's lifecycle—such as "cancel subscription", "add new order", "amend contract", "extend contract", or any action taken by sales or operations teams at the platform 102 (or self-service by an end customer), they may be fed into the headless API module 200, so that appropriate adjustments may be made by the platform 102 to the time streams and time stream intervals and other data objects in the platform 102 such as price matrix.

In some embodiments, there are two external inputs that flow into the headless API module 200, such as (a) customer usage events (consumption events) from various sources such as mediation partners, ETL providers, etc., and (b) customer lifecycle events from various sources such as CRMs—these are, for example, events for creating a charge, modifying a charge, etc.

In some embodiments, the platform 102 does not have a quoting or CRM system to handle the creation or modification of charges, and a user interface (UI) based on the headless API module 200 is provided to allow the platform 102 to directly interact with the headless API module 200.

The output of the headless API module 200, may flow into external systems—such as billable items, forecasting data, cost data, etc., which may be further transmitted to external billing systems to generate invoices, or an analytic tool the output of the headless API module 200 to provide reports and business insights.

The one or more users associated with the platform 102 may interact with the headless API module 200 application in various ways, e.g. APIs (either synchronous or asynchronous), or files formats including JavaScript Object Notation (JSON), comma-separated values (CSV), or Extensible Markup Language (XM), etc. As an example, the following is the usage data in JSON format:

Example Data Format for Usage Log:

Each usage event may be sent to the headless API module 200 as a CSV or as JSON, adhering to a template that is defined and customizable for every customer of the platform 102.

An example usage data template is shown below:

```
{
"_id": "smartmonitor-csv",
"header": [
"id",
"effectiveDate",
"startDate",
"endDate",
"quantity",
"type",
"externalChargeId",
"source_systemId",
"source_transactionType",
"source_transactionAction",
"source_transactionAmount",
"source_transactionCurrency",
"prerated_amount",
"prerated_quantity",
"prerated_tax",
"estimatedTax"
],
"payloadFields": {
"effectiveDate": {
"type": "DateTime"
},
"startDate": {
"type": "DateTime"
},
"endDate": {
"type": "DateTime"
},
"quantity": {
"type:" "Number"
},
"prerated_tax": {
"type": "Number"
},
"prerated_quantity": {
"type": "Number"
},
"prerated_amount": {
"type": "Number"
},
"estimatedTax": {
"type": "Number"
}
},
```

```
"payloadFormat": "CSV",
"recordFields": {
"id": "usagePayload.id",
"correlationId": "usagePayload.externalChargeId",
"effectiveDate": "usagePayload.effectiveDate",
"startDate": "usagePayload.startDate",
"endDate": "usagePayload.endDate"
}
}
```

3 Sample CSV payloads are shown below:
"DTTD-DP-704". "2022-10-01T07:00:00.000Z". "2022-10-01T07:00:00.000Z". "2022-10-01T12:59:59.000Z", "9.170", "DataProcessing", "CID-00000115", "CAM-77", "TR-H8PYICv7nc", "Analyze", " ", " ", "3.67", "9.170", "0.46", "0.55"
"DTTD-DP-705", "2022-10-01T07:00:00.000Z", "2022-10 01T13:00:00.000Z", "2022-10-01T18:59:59.000Z", "5.592", "DataProcessing", "CID-00000115", "CAM-310", "TR-xP5XMQ7YFU", "Analyze", " ", " ", "2.24", "5.592", "0.28", "0.34"
"DTTD-DP-706", "2022-10-01T07:00:00.000Z", "2022-10-01T19:00:00.000Z", "2022-10-02T00:59:59.000Z", "9.236", "DataProcessing", "CID-00000115", "CAM-382", "TR-3EIceqQC2T", "Analyze", " ", " ", "3.69", "9.236", "0.46", "0.55"

Figure 4:
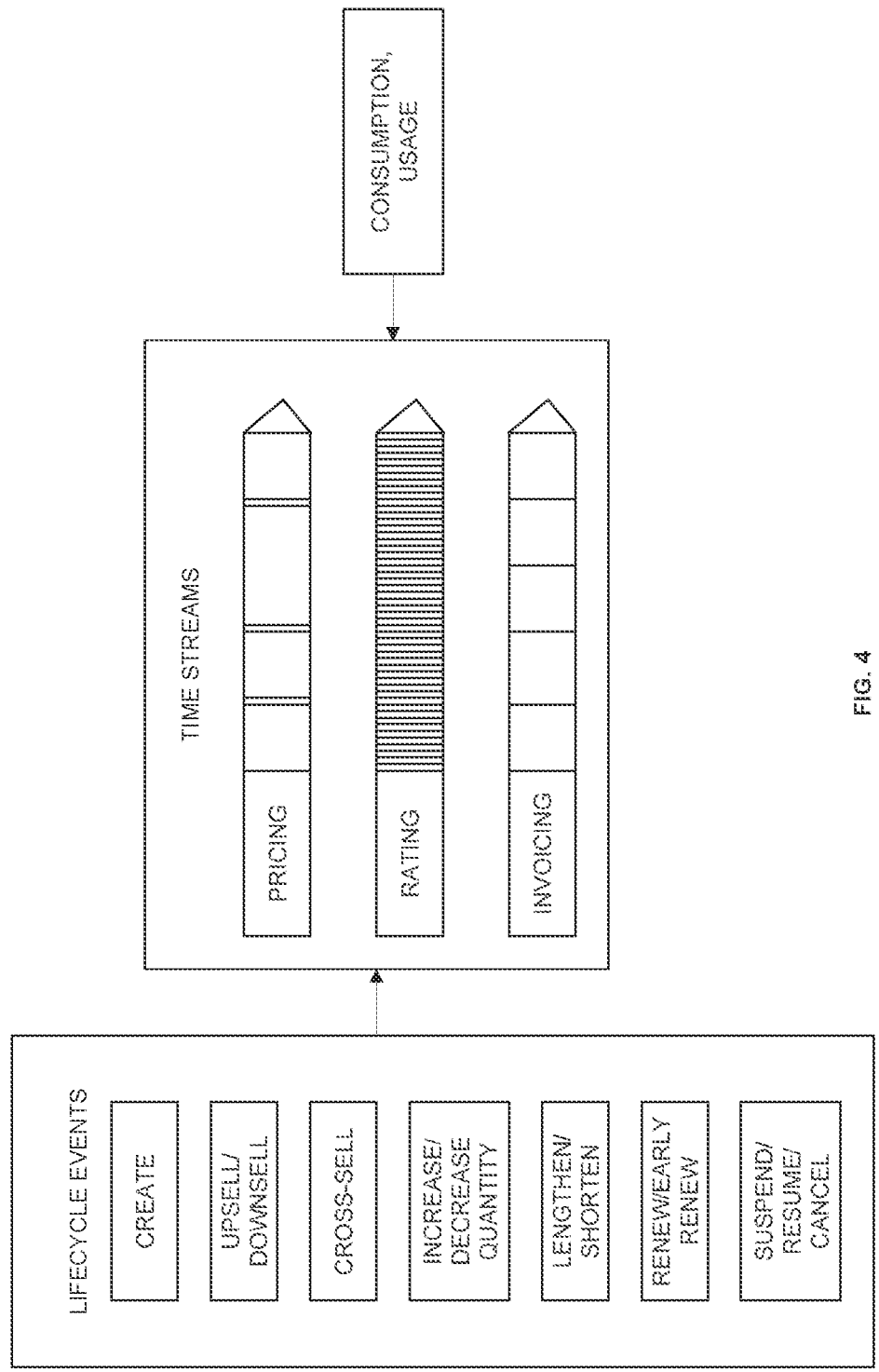
FIG. 4 is an exemplary diagram that illustrates the time streams generated by the time stream engine of FIG. 1 according to some embodiments herein.

FIG. 4 is an exemplary diagram 400 that illustrates the time streams generated by the time stream engine of FIG. 1 according to some embodiments herein. The time streams and intervals capture the parameters of an entity of the platform 102 as a function of time. As an example, pricing can be determined with the following formula:

$$P(t)=\text{ListPrice}(t) \text{ or } P(t)=\text{Matrix}(t)$$

Where P(t) is a function of pricing over time, T is a time variable and "ListPrice" or "Matrix" are mathematical formulas that return price for each given time. The function always returns the same value for a given interval (timeframe) but when time becomes a continuum, one formula can result in different values for different timeframes. Hence, different values are stored at different intervals. Different timestreams may be observed to obtain an insight about what should be priced, what should be billed, what has been priced, what has been billed, etc. An aggregation of slices of information that are observed across timestreams is referred to as a continuum.

As an example, products monetized by usage and consumption over time or with a consumable balance do not have a way to track the impact of each user's consumption over time. Particularly when pricing changes, customers consume the product at different rates or with seasonality. Each of these consumption events over time may have different impacts on pricing, forecasting, revenue, and invoicing.

In some embodiments, the platform 102 may offer usage and consumption pricing models to the customers that pay a prepaid amount. The platform 102 may offer tracking based on the usage of multiple products over time, or with special pricing that is given with a commitment to consume a predefined amount in a specific period. In some embodiments, the time stream engine 112 enables tracking when customers mix different account balances (prepaid, commitment, etc.) in connection with a subscription. A CRM may send an order to the ERP, the ERP does invoice and the time stream engine 112 provides the usage rating, hybrid subscription, prepayment, and commitment models via extensive interaction between the CRM and the ERP to synchronize a context of what the customer sees and what the platform 102 needs to track. Implementing the time stream engine 112 between the CRM and the ERP systems provides an ability to track the lifecycle of the user with required granularity, and the platform 102 is able to offer the launch of new products rapidly.

Figure 5:
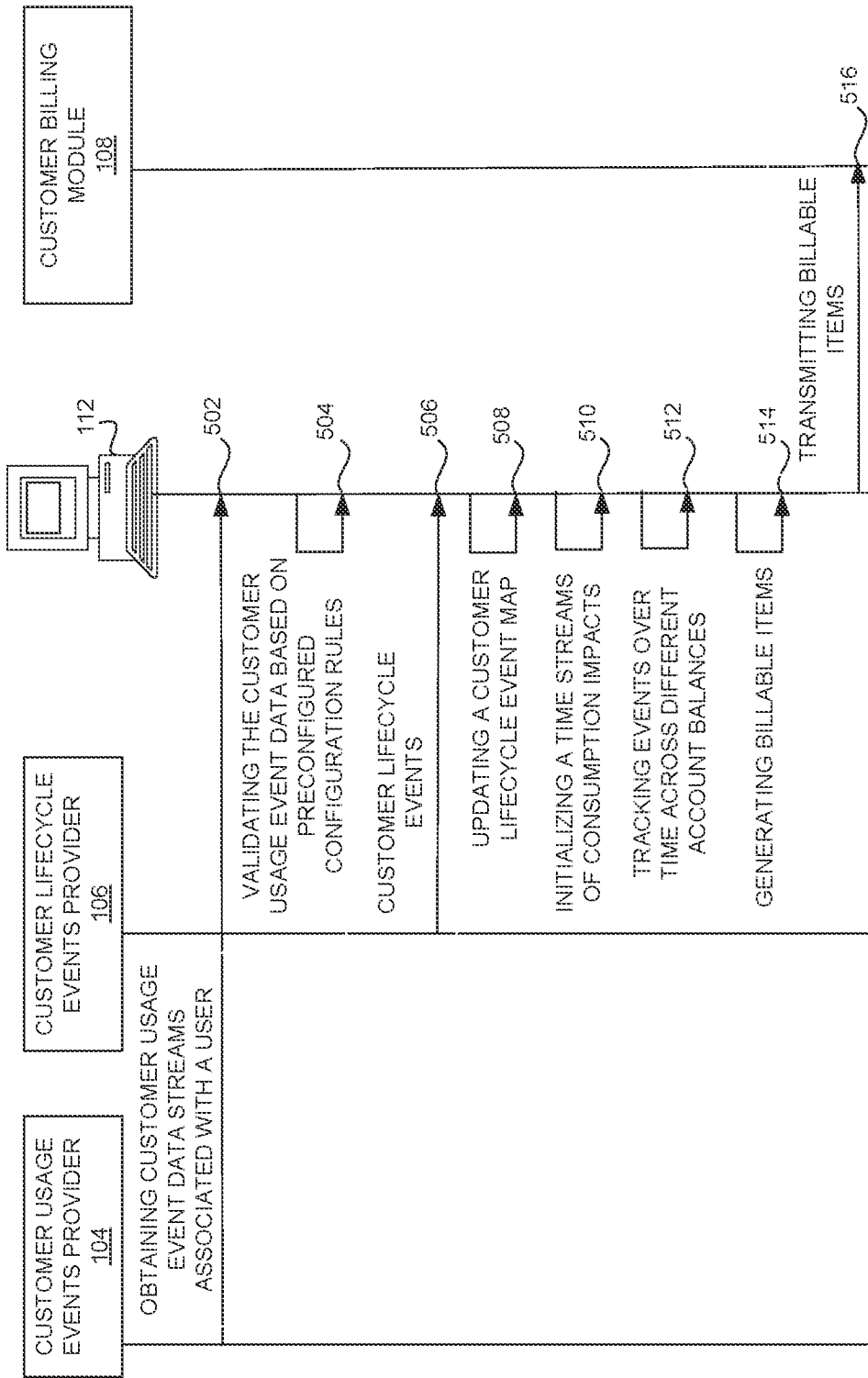
FIG. 5 illustrates an interaction diagram for a method for generating billable items (consumption artifacts) based on customer event data according to some embodiments herein.

FIG. 5 illustrates an interaction diagram 500 for a method for generating billable items (consumption artifacts) based on customer event data according to some embodiments herein. At step 502, data streams of customer activity, consumption, and/or usage event are obtained from the customer usage events provider, where the data streams are associated with a customer of the application, a partner of the application, or an account. At step 504, the customer consumption usage event data is validated in real-time or via batch intervals based on preconfigured configuration rules. At step 506, customer lifecycle events that are obtained from the customer lifecycle events provider. At step 508, a customer lifecycle event mapping is updated using the customer lifecycle events. At step 510, time streams of consumption impacts are initialized at a configurable time stream interval, wherein the time streams include a pricing time stream, a rating time stream and an invoicing time stream. At step 512, each event in the customer usage event data is evaluated and tracked in real-time across different account balances associated with the user using the time streams of consumption impacts. At step 514, billable items (consumption artifacts) for the user are generated by mapping customer consumption usage event data with a predefined charge using a headless application programming interface (API). At step 516, the billable items (consumption artifacts) are transmitted to the customer billing module 108.

FIG. 6 is a flow diagram 600 that illustrates a method for dynamically generating consumption artifacts for platforms using independent processing of usage event data streams according to some embodiments herein. At step 602, the method includes obtaining usage event data streams through calls to an application programming interface (API), wherein the usage event data streams include a unit of measure, a quantity, and a date and time of occurrence. At step 604, the method includes updating, using a processor, a technical lifecycle event map based on the usage event data streams. At step 606, the method includes initializing time streams of consumption impacts at a configurable time stream interval that represents a slice of time within the time stream and specific usage event data associated with the time stream, wherein the time streams comprise pricing timestreams, rating time streams, and invoicing time streams. At step 608, the method includes performing independent logic processing for each category of time stream of consumption. At step 610, the method includes invoking specific algorithms and data models for a plurality of computation modules to process each consumption event in real-time across multiple timestreams. At step 612, the method includes mapping the processed technical data to predefined technical structures using a headless API to dynamically generate a set of consumption artifacts that are associated with usage consumptions to transmit to an external system.

The method is of advantage that the method enables precise and real-time mapping of processed technical data to predefined technical structures using a headless API. This capability facilitates seamless and automated generation of a set of consumption artifacts associated with usage consumptions. The method provides a dynamic and adaptive approach, ensuring that the generated consumption artifacts accurately reflect the evolving parameters of the time streams, including pricing, rating, and invoicing. This not only enhances the efficiency of the method but also mitigates the challenges posed by traditional, static artifact generation processes.

Another technical advantage is that the method enables performing independent logic processing for each category of time stream of consumption. By utilization of computational modules and invoking specific algorithms and data models, the method is able to process each consumption event in real-time across multiple timestreams. This ensures a granular and context-aware generation of consumption artifacts, considering the dynamics of pricing, rating, and invoicing, thereby providing improved accuracy and adaptability, addressing the challenges associated with conventional approaches that lack the computational precision required for dynamic generation of consumption artifacts.

The embodiments herein may include a computer program application configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
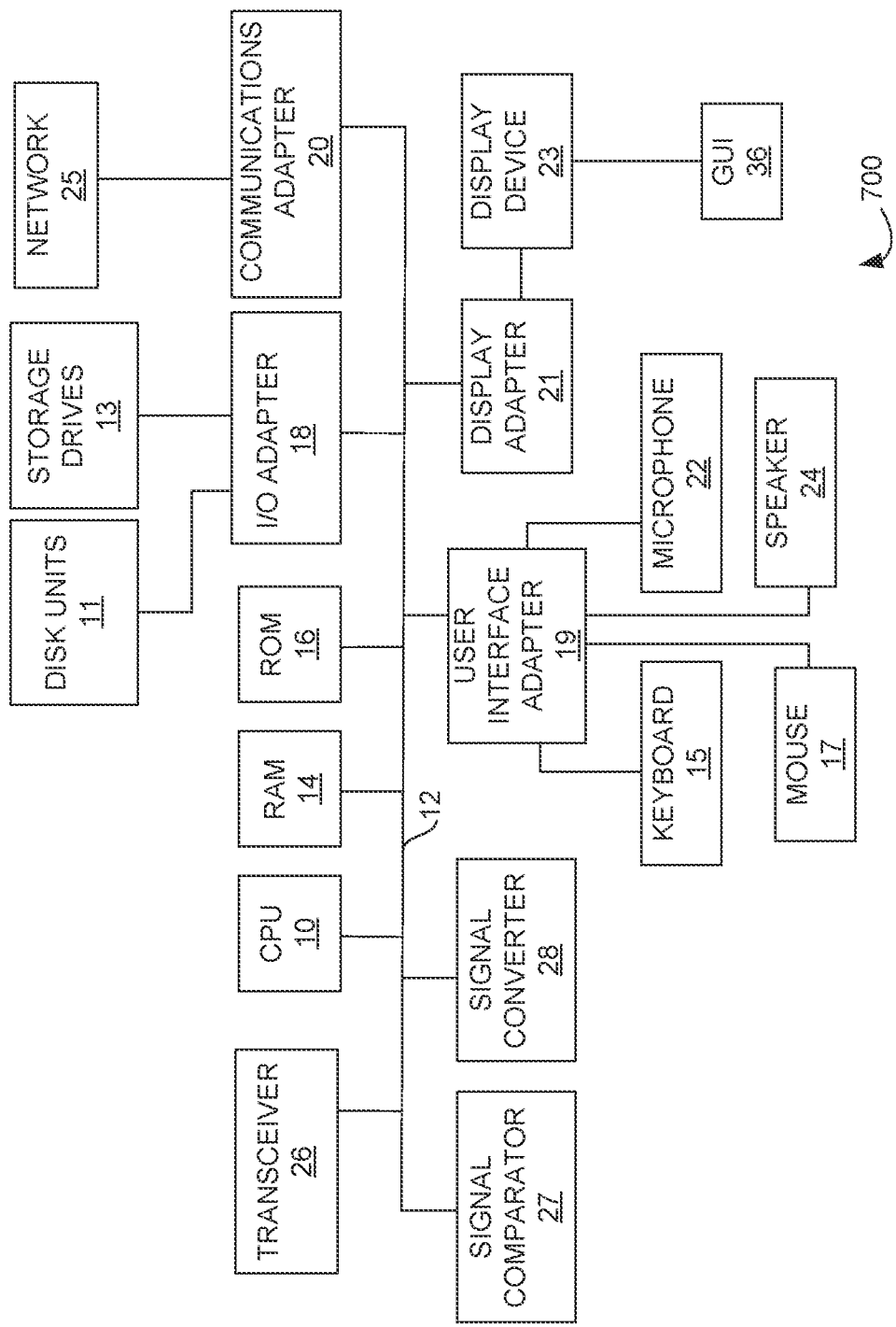
FIG. 7 is a representative hardware environment for practicing the embodiments herein.

A representative hardware environment for practicing the embodiments herein is depicted in FIG. 7, with reference to FIGS. 1 through 6. This schematic drawing illustrates a hardware configuration of a time stream engine 112 or a computer system or a computing device in accordance with the embodiments herein. This schematic drawing illustrates a hardware configuration of a software development device/computer system 700 in accordance with the embodiments herein. The system includes at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and storage drives 13, or other program storage devices that are readable by the system. The system can read the inventive instructions on the program storage devices and follow these instructions to execute the methodology of the embodiments herein. The system 600 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for dynamically generating consumption artifacts for platforms using independent processing of usage event data streams, the method comprising:
   obtaining usage event data streams through calls to an application programming interface (API) securely via the internet, wherein the usage event data streams include a unit of measure, a quantity, and a date and time of occurrence;
   updating, using a processor, a technical lifecycle event map based on the usage event data streams;
   initializing multiple distinct time streams of consumption impacts at a configurable time stream interval that represents a slice of time within the time stream and specific usage event data associated with the time stream, wherein the time streams comprise pricing timestreams, rating time streams, and invoicing time streams that are processed independently and can operate in real-time or non-real-time;
   processing, on a distributed computer architecture, an independent logic for each category of time stream of consumption, wherein at least one processing step of the independent logic is executed on a different computer;

invoking specific algorithms and data models for a plurality of computation modules to process each consumption event in real-time across multiple timestreams;

dynamically updating the technical lifecycle event map and associated consumption artifacts; and mapping the processed technical data to predefined technical structures using a headless API to dynamically generate a set of consumption artifacts that are associated with usage consumptions to transmit to an external system securely via the internet.

2. The processor-implemented method of claim 1, further comprising aggregating and validating the user event data streams based on predefined rules.

3. The processor-implemented method of claim 1, wherein the configurable time stream interval is selected from a group consisting of annual, quarterly, monthly, weekly, daily, hourly, and minute intervals.

4. The processor-implemented method of claim 1, further comprising mapping, using the headless API, usage event data with a predefined charge to generate billable items (consumption artifacts).

5. The processor-implemented method of claim 4, further comprising processing the set of consumption artifacts to generate an invoice, wherein the invoice includes details of the mapped usage event data and the predefined charge.

6. A system for dynamically generating consumption artifacts for platforms using independent processing of usage event data streams, comprising:

a memory that stores a set of instructions; and a processor that is configured to execute the set of instructions for:

obtaining usage event data streams through calls to an application programming interface (API) securely via the internet, wherein the usage event data streams include a unit of measure, a quantity, and a date and time of occurrence;

updating, using a processor, a technical lifecycle event map based on the usage event data streams;

initializing multiple distinct time streams of consumption impacts at a configurable time stream interval that represents a slice of time within the time stream and specific usage event data associated with the time stream, wherein the time streams comprise pricing timestreams, rating time streams, and invoicing time streams that are processed independently and can operate in real-time or non-real-time;

processing, on a distributed computer architecture, an independent logic for each category of time stream of consumption, wherein at least one processing step of the independent logic is executed on a different computer;

invoking specific algorithms and data models for a plurality of computation modules to process each consumption event in real-time across multiple timestreams;

dynamically updating the technical lifecycle event map and associated consumption artifacts; and mapping the processed technical data to predefined technical structures using a headless API to dynamically generate a set of consumption artifacts that are associated with usage consumptions to transmit to an external system securely via the internet.

7. The system of claim 6, further comprising aggregating and validating the user event data streams based on predefined rules.

8. The system of claim 6, wherein the configurable time stream interval is selected from a group consisting of annual, quarterly, monthly, weekly, daily, hourly, and minute intervals.

9. The system of claim 6, further comprising mapping, using the headless API, usage event data with a predefined charge to generate billable items (consumption artifacts).

10. The system of claim 9, further comprising processing the set of consumption artifacts to generate an invoice, wherein the invoice includes details of the mapped usage event data and the predefined charge.

11. A non-transitory computer-readable storage medium storing a sequence of instructions, which when executed by one or more processors, causes deriving a subset from a dataset based on proclivity of entity devices towards a category, comprising:

obtaining usage event data streams through calls to an application programming interface (API) securely via the internet, wherein the usage event data streams include a unit of measure, a quantity, and a date and time of occurrence;

updating, using a processor, a technical lifecycle event map based on the usage event data streams;

initializing multiple distinct time streams of consumption impacts at a configurable time stream interval that represents a slice of time within the time stream and specific usage event data associated with the time stream, wherein the time streams comprise pricing timestreams, rating time streams, and invoicing time streams that are processed independently and can operate in real-time or non-real-time;

processing, on a distributed computer architecture, an independent logic for each category of time stream of consumption, wherein at least one processing step of the independent logic is executed on a different computer;

invoking specific algorithms and data models for a plurality of computation modules to process each consumption event in real-time across multiple timestreams;

dynamically updating the technical lifecycle event map and associated consumption artifacts; and mapping the processed technical data to predefined technical structures using a headless API to dynamically generate a set of consumption artifacts that are associated with usage consumptions to transmit to an external system securely via the internet.

12. The non-transitory computer readable storage medium storing a sequence of instructions of claim 11, further comprising aggregating and validating the user event data streams based on predefined rules.

13. The non-transitory computer readable storage medium storing a sequence of instructions of claim 12, wherein the configurable time stream interval is selected from a group consisting of annual, quarterly, monthly, weekly, daily, hourly, and minute intervals.

14. The non-transitory computer readable storage medium storing a sequence of instructions of claim 13, further comprising mapping, using the headless API, usage event data with a predefined charge to generate billable items (consumption artifacts).

15. The non-transitory computer readable storage medium storing a sequence of instructions of claim 14, further comprising processing the set of consumption artifacts to generate an invoice, wherein the invoice includes details of the mapped usage event data and the predefined charge.

* * * * *